US006806806B2

(12) United States Patent
Anthony

(10) Patent No.: US 6,806,806 B2
(45) Date of Patent: Oct. 19, 2004

(54) POLYMER FUSE AND FILTER APPARATUS

(75) Inventor: Anthony A. Anthony, Erie, PA (US)

(73) Assignee: X2Y Attenuators, LLC, Santa Monica, CA (US)

(*) Notice: Subject to any disclaimer, the term of this patent is extended or adjusted under 35 U.S.C. 154(b) by 201 days.

(21) Appl. No.: 10/369,335

(22) Filed: Feb. 18, 2003

(65) Prior Publication Data

US 2003/0210125 A1 Nov. 13, 2003

Related U.S. Application Data

(60) Continuation of application No. 10/142,026, filed on May 9, 2002, now Pat. No. 6,522,516, which is a continuation of application No. 09/939,547, filed on Aug. 24, 2001, now Pat. No. 6,388,856, which is a continuation of application No. 09/583,831, filed on May 31, 2000, now Pat. No. 6,282,074, which is a division of application No. 09/238,312, filed on Jan. 28, 1999, now Pat. No. 6,157,528.

(51) Int. Cl.[7] .................. H01H 1/00; H01H 85/044; H04B 1/00; H04B 1/03; H04B 1/74
(52) U.S. Cl. .................. 337/199; 337/158; 337/222; 337/224; 361/106; 361/111; 361/113; 361/118; 361/157; 333/12
(58) Field of Search ................ 337/190, 197, 337/186, 198, 216, 141, 142, 199, 227, 224, 246, 248, 251; 361/56, 58, 106, 103, 115, 24–27, 111, 816, 818, 91.1–91.8, 113, 117–119, 127–302; 333/12

(56) References Cited

U.S. PATENT DOCUMENTS

| | | | | | |
|---|---|---|---|---|---|
| 4,023,071 A | * | 5/1977 | Fussell | ............... | 361/56 |
| 4,135,132 A | | 1/1979 | Tafjord | | |
| 4,586,104 A | * | 4/1986 | Standler | ............... | 361/119 |
| 4,636,752 A | | 1/1987 | Saito | | |
| 4,685,025 A | | 8/1987 | Carlomagno | | |
| 4,780,598 A | * | 10/1988 | Fahey et al. | ............... | 219/511 |
| 4,814,941 A | | 3/1989 | Speet et al. | | |
| 4,847,730 A | * | 7/1989 | Konno et al. | ............... | 361/306.2 |
| 5,089,688 A | * | 2/1992 | Fang et al. | ............... | 219/505 |
| 5,109,206 A | * | 4/1992 | Carlile | ............... | 333/177 |
| 5,140,297 A | * | 8/1992 | Jacobs et al. | ............... | 338/22 R |
| 5,142,430 A | * | 8/1992 | Anthony | ............... | 361/56 |
| 5,148,005 A | * | 9/1992 | Fang et al. | ............... | 219/505 |

(List continued on next page.)

FOREIGN PATENT DOCUMENTS

| | | |
|---|---|---|
| JP | 9-284077 | 10/1997 |
| JP | 9-284078 | 10/1997 |

OTHER PUBLICATIONS

Tony Fang and Stephen Morris, "Conductive Polymers Prolong Circuit Lif," Design News.
Roy B. Carpenter, Jr. and Mark N. Drabkin Ph.D., "A New Approach to TVSS design," Power Quality Assurance, (Sep./Oct. 1996).
Raychem, "PolySwitch Resettable Fuses," Circuit Protection Databook, (Jan. 1996).

*Primary Examiner*—Anatoly Vortman
(74) *Attorney, Agent, or Firm*—Neifeld IP Law, PC

(57) ABSTRACT

A fuse and filter arrangement having a polymer fuse apparatus that provides bypass fuse protection. A polymer bypass fuse includes of an electrical conductor wherein a portion of the conductor is surrounded by an internal electrode, which is then surrounded by a layer of polymeric positive temperature coefficient (PTC) material, which is then surrounded by a conductive material similar to that of the internal electrode.

The fuse and filter arrangement includes a plurality of in-line and bypass fuses combined with a differential and common mode filter, which itself consists of a plurality of common ground conductive plates maintaining first and second electrode plates between the various conductive plates, all of which are surrounded by a material having predetermined electrical characteristics to provide fail safe filter and circuit protection.

20 Claims, 6 Drawing Sheets

U.S. PATENT DOCUMENTS

| | | | |
|---|---|---|---|
| 5,179,362 A | | 1/1993 | Okochi et al. |
| 5,243,308 A | | 9/1993 | Shusterman et al. |
| 5,300,760 A | | 4/1994 | Batliwalla et al. |
| 5,321,373 A | * | 6/1994 | Shusterman et al. ........... 333/12 |
| 5,357,568 A | * | 10/1994 | Pelegris ....................... 361/119 |
| 5,378,407 A | | 1/1995 | Chandler et al. |
| 5,382,938 A | * | 1/1995 | Hansson et al. .......... 338/22 R |
| 5,451,919 A | | 9/1995 | Chu et al. |
| 5,461,351 A | | 10/1995 | Shusterman |
| 5,471,035 A | | 11/1995 | Holmes |
| 5,493,260 A | * | 2/1996 | Park ........................... 333/185 |
| 5,500,629 A | * | 3/1996 | Meyer ........................ 333/181 |
| 5,614,881 A | | 3/1997 | Duggal et al. |
| 5,645,746 A | | 7/1997 | Walsh |
| 5,708,553 A | * | 1/1998 | Hung .......................... 361/103 |
| 5,796,568 A | | 8/1998 | Baiatu |
| 5,838,216 A | * | 11/1998 | White et al. ................. 333/182 |
| 5,909,350 A | * | 6/1999 | Anthony ...................... 361/118 |
| 5,980,718 A | | 11/1999 | Van Konynenburg et al. |
| 6,018,448 A | * | 1/2000 | Anthony ....................... 361/56 |
| 6,097,581 A | * | 8/2000 | Anthony ....................... 361/56 |
| 6,157,528 A | * | 12/2000 | Anthony ...................... 361/106 |
| 6,282,074 B1 | * | 8/2001 | Anthony ...................... 361/106 |
| 6,388,856 B1 | * | 5/2002 | Anthony ...................... 361/106 |
| 6,522,516 B2 | * | 2/2003 | Anthony ...................... 361/119 |

* cited by examiner

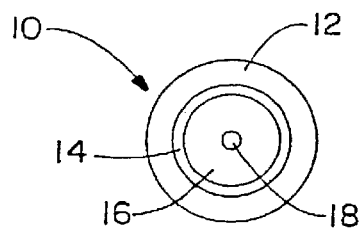
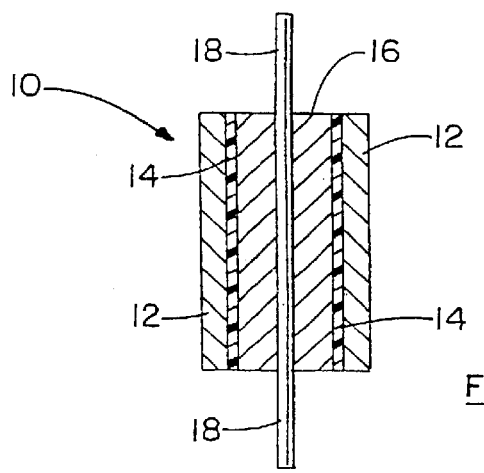
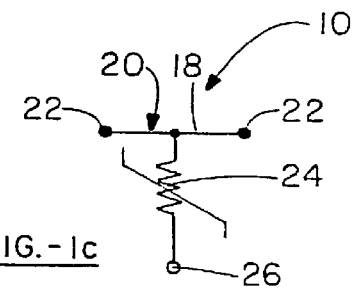
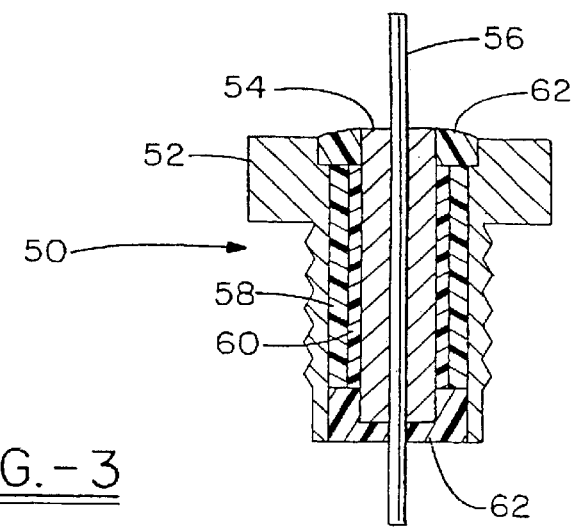

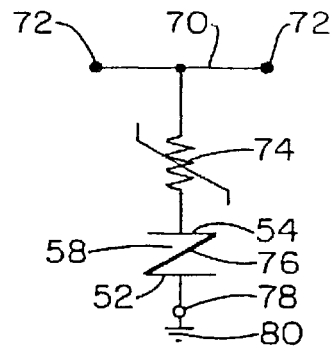
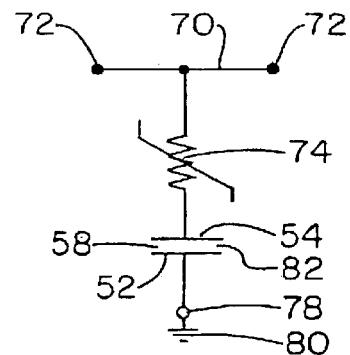
FIG.-4     FIG.-5
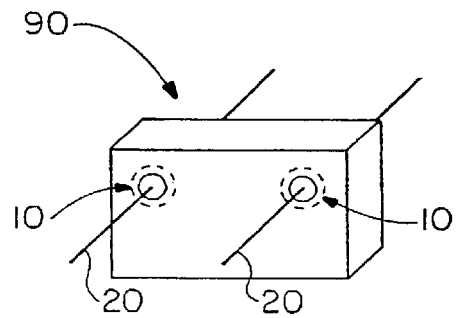
FIG.-6
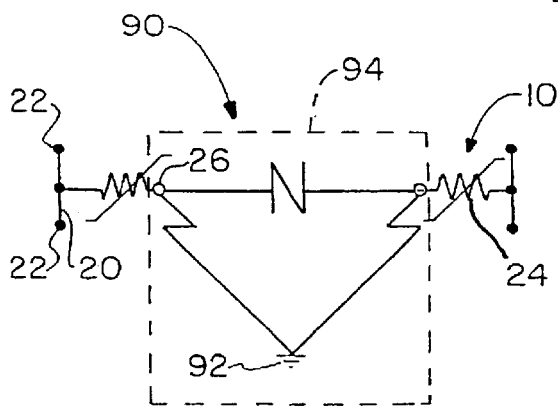
FIG.-7
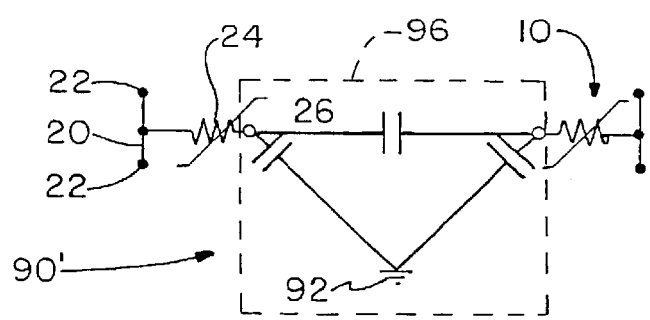
FIG.-8

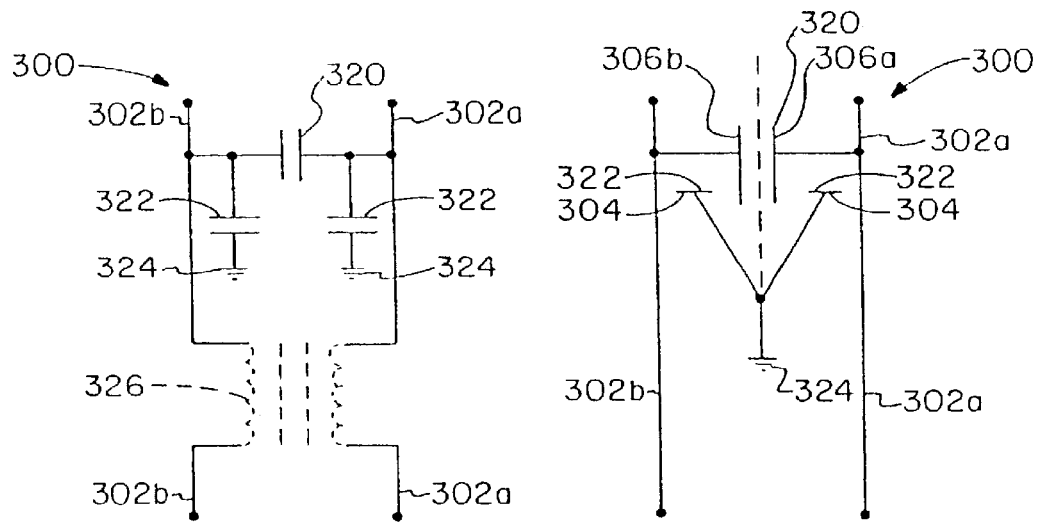
FIG.-15  FIG.-16
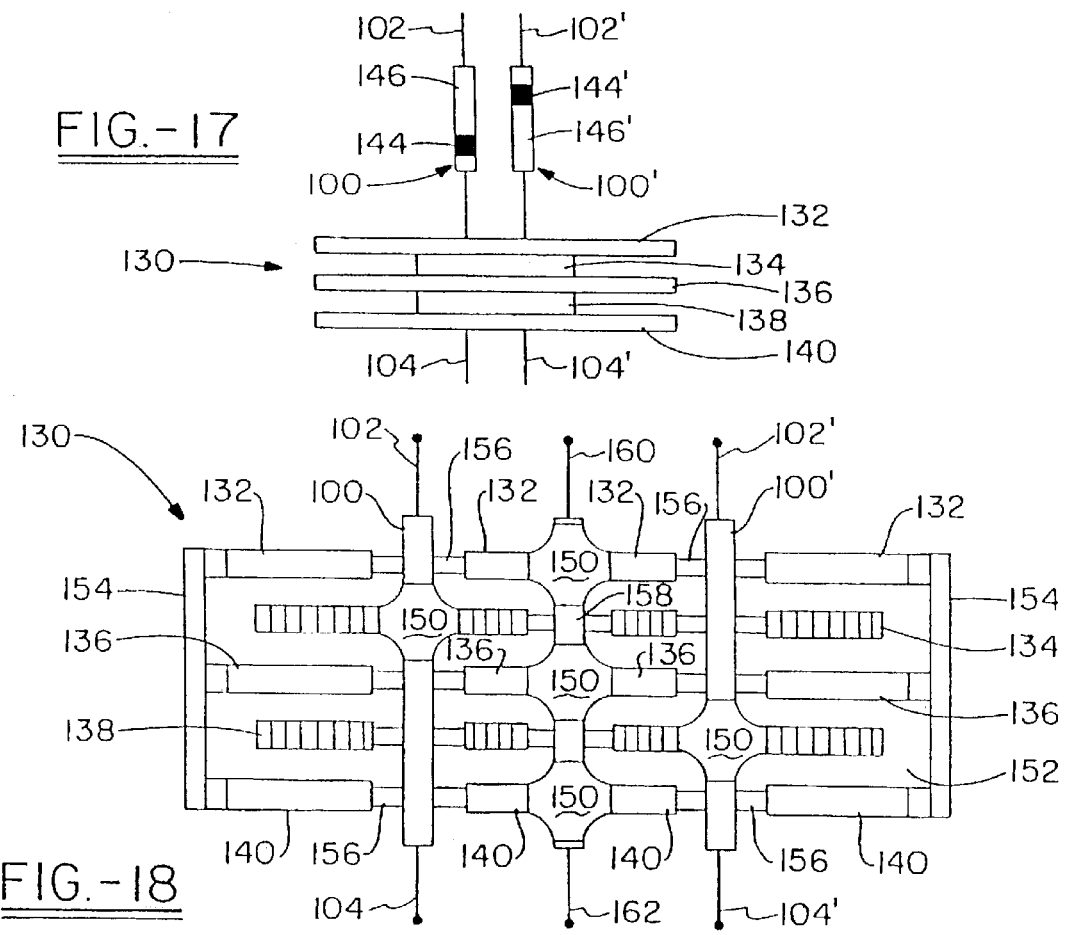
FIG.-17
FIG.-18

POLYMER FUSE AND FILTER APPARATUS

TECHNICAL FIELD

This application is a continuation of co-pending application Ser. No. 10/142,026 filed May 9, 2002 now U.S. Pat. No. 6,522,516, which is a continuation of application Ser. No. 09/939,547 filed Aug. 24, 2001, now issued as U.S. Pat. No. 6,388,856, which is a continuation of application Ser. No. 09/583,831 filed May 31, 2000, now issued as U.S. Pat. No. 6,282,074, which is a divisional of application Ser. No. 09/238,312 filed Jan. 28, 1999, now issued as U.S. Pat. No. 6,157,528. Application Ser. Nos. 09/238,312, 09/583,831, 09/939,547, and 10/142,026 are hereby incorporated by reference. The present invention relates to polymeric positive temperature coefficient (PTC) over current protection devices and more specifically with a polymeric over current protection device an in-line and/or bypass fuses with additional electronic circuitry.

BACKGROUND OF THE INVENTION

Abnormally high currents or over currents have the potential to destroy electrical circuitry and equipment plus become a safety/shock hazard to people. For years electrical equipment has been protected through the use of fuses or circuit breakers. The typical fuse has an internal by-metallic conductor through which current passes. If the current through the system exceeds the rated value of the fuse, the by-metallic conductor will begin to melt. If the over current continues, eventually the by-metallic conductor will melt through thereby breaking the current path between the supply and the load. Circuit breakers break the current path between the power source and the load just as the fuse except that in the case of the circuit breaker an electromagnet in the device draws a connecting metallic link out of the circuit when current levels exceed rated conditions thereby opening the current path.

While typical fuses are effective in protecting electrical equipment they must be replaced once the by-metallic conductor has melted thereby proving not to be cost effective, both with regard to replacement and maintenance costs. Circuit breakers on the other hand are reusable but are typically more expensive than fuses and still require user intervention to reset them once an over current has been corrected.

An improvement over by-metallic fuses and circuit breakers is the polymeric (positive temperature coefficient) PTC device which protects circuits by going from a low to a high resistance state in response to an over current. Polymeric PTC devices respond to over currents by increasing their resistance as the device's temperature increases due to the generation of heat within the device from power dissipation. The advantage these devices provide is that once the over current condition has been corrected and the devices temperature decreases to its normal operating point, its resistance will decrease in effect resetting the device. Polymeric PTC devices provide the compact dimensions provided by fuses with the ability to be reused as provided by circuit breakers. These devices have the added advantage of being automatically reset once normal operating conditions in a circuit are restored.

To date, polymeric PTC devices have been manufactured in standard electronic packaging, similar to a disk capacitor, in which the polymeric material is encapsulated in a disk shaped enclosure with two wire leads extending therefrom. This type of packaging is designed for through hole circuit board mounting. While this configuration protects circuitry from over current conditions, the through hole wire leads and associated copper tracks and wiring used to connect the polymer PTC devices cause another problem, that being radiated emissions of electro-magnetic noise.

The wire leads and copper tracks used by the polymeric PTC devices are effected by two different types of conductive currents, differential mode and common mode. The fields generated by these currents create the radiated emissions. Differential mode currents are currents which flow in a circular path in wires, copper traces, and other conductors such that the fields associated with these currents originates from the loop defined by the conductors. Such a circuit is essentially a loop antenna with the resulting field being primarily magnetic. Differential mode emissions are typically found at frequencies below 1 MHz.

Common mode currents are completely different in nature from differential mode currents in that they flow in a different circuit path and dominate at higher frequencies, those typically above 1 MHz. Common mode currents typically return to their source through parasitic capacitance inherently found in electronic circuits. To minimize common mode currents between lines, an alternate low impedance return path for these currents must be provided while increasing the impedance of the common mode current path.

A major drawback to differential and common mode filters of the prior art is that if capacitors failed they would adversely affect the circuitry they were originally used to filter or protect. Dependent upon the application, this condition would also present a safety hazard to humans. To overcome this problem numerous fuses had to be employed in various configurations to ensure the electrical conductors to be filtered were protected from both the filter and other circuitry. Despite the numerous fuses and inconvenience of using so many fuses, in many applications it was absolutely necessary to prevent inconvenience or even life threatening conditions. One example is the use of filters in the automotive industry. When used to filter differential and common mode electrical noise from conductors in power steering or power brakes, filtering improves the overall operation but is not critical to this operation but if the filter failed and destroyed surrounding other circuitry, the brake or power steering systems could become disabled either stranding or endangering the driver if failure occurred while the vehicle was moving. Because of this it is critical that any filters used be self protecting in that they effectively remove themselves from circuitry they were originally intended to protect upon their failure.

As a result, one object of the present invention is to provide in-line and/or bypass fuse protection in a single, compact electrical device which allows defective circuitry to disconnect or remove itself from protected circuitry while not presenting a safety hazard.

It is a further object of the present invention to provide a compact hybrid device which combines various types of filter and surge protection with in-line and/or bypass fuse protection to improve overall circuit performance and insure that under extreme conditions partial circuit failure does not damage additional circuitry.

It is an additional object of the present invention to provide a filter apparatus capable of removing itself from additional circuitry upon its own failure such that continued operation of the overall system can be maintained in spite of the filter's failure thereby providing additional safety when used in conjunction with systems whose failure can endanger human life.

Therefore, in light of the foregoing deficiencies in the prior art, Applicant's invention is herein presented.

SUMMARY OF THE INVENTION

The present invention relates to a polymer fuse apparatus that provides bypass fuse protection. A polymer bypass fuse is comprised of an electrical conductor wherein a portion of the conductor is surrounded by an internal electrode, which is then surrounded by a layer of polymeric positive temperature coefficient (PTC) material, which is then surrounded by a conductive material similar to that of the internal electrode.

During normal operation the polymeric PTC material is in a conductive state thereby allowing electrical coupling between the conductor and the outer conductive material or contact electrode. If the current through the polymeric PTC material increases beyond acceptable limits, the polymeric PTC material will become highly resistive thereby creating an open condition which prevents conduction. Various hybrid combinations are also contemplated where in-line and/or bypass fuses are combined with other circuit components. One example is, a plurality of in-line and bypass fuses combined with a differential and common mode filter, which itself consists of a plurality of common ground conductive plates maintaining first and second electrode plates between the various conductive plates, all of which are surrounded by a material having predetermined electrical characteristics to provide filter and circuit protection.

BRIEF DESCRIPTION OF THE DRAWINGS

FIG. 1 shows the polymer fuse of the present invention wherein FIG. 1a is a front elevational view in cross section, FIG. 1b is a top plan view of the same and FIG. 1c is a schematic representation of the same;

FIG. 3 is a front elevational view in cross section of a hybrid polymer bypass fuse having additional electronic components;

FIG. 4 is a schematic representation of the assembly of FIG. 3 wherein the additional electronic component is a varsity;

FIG. 5 is a schematic representation of the assembly of FIG. 3 wherein the additional electronic component is a capacitor;

FIG. 6 is a perspective view of a line filter which employs the polymer bypass fuse shown generally in FIG. 1;

FIG. 7 is a schematic representation of the line filter depicted in FIG. 6 designed for over current protection;

FIG. 8 is a schematic representation of the line filter depicted in FIG. 6 designed to suppress electromagnetic from to differential and common mode currents;

FIG. 15 provides a schematic diagram of the filter shown in FIG. 14;

FIG. 16 provides a schematic representation of the physical architecture of the filter shown in FIG. 14;

FIG. 17 is an exploded perspective view of the differential and common mode filter having in-line and bypass fuse protection; and FIG. 18 is a perspective view in cross-section of the differential and common mode filter having in-line and bypass fuse protection as shown in FIG. 17.

DETAILED DESCRIPTION OF THE PREFERRED EMBODIMENT

Figure 2:
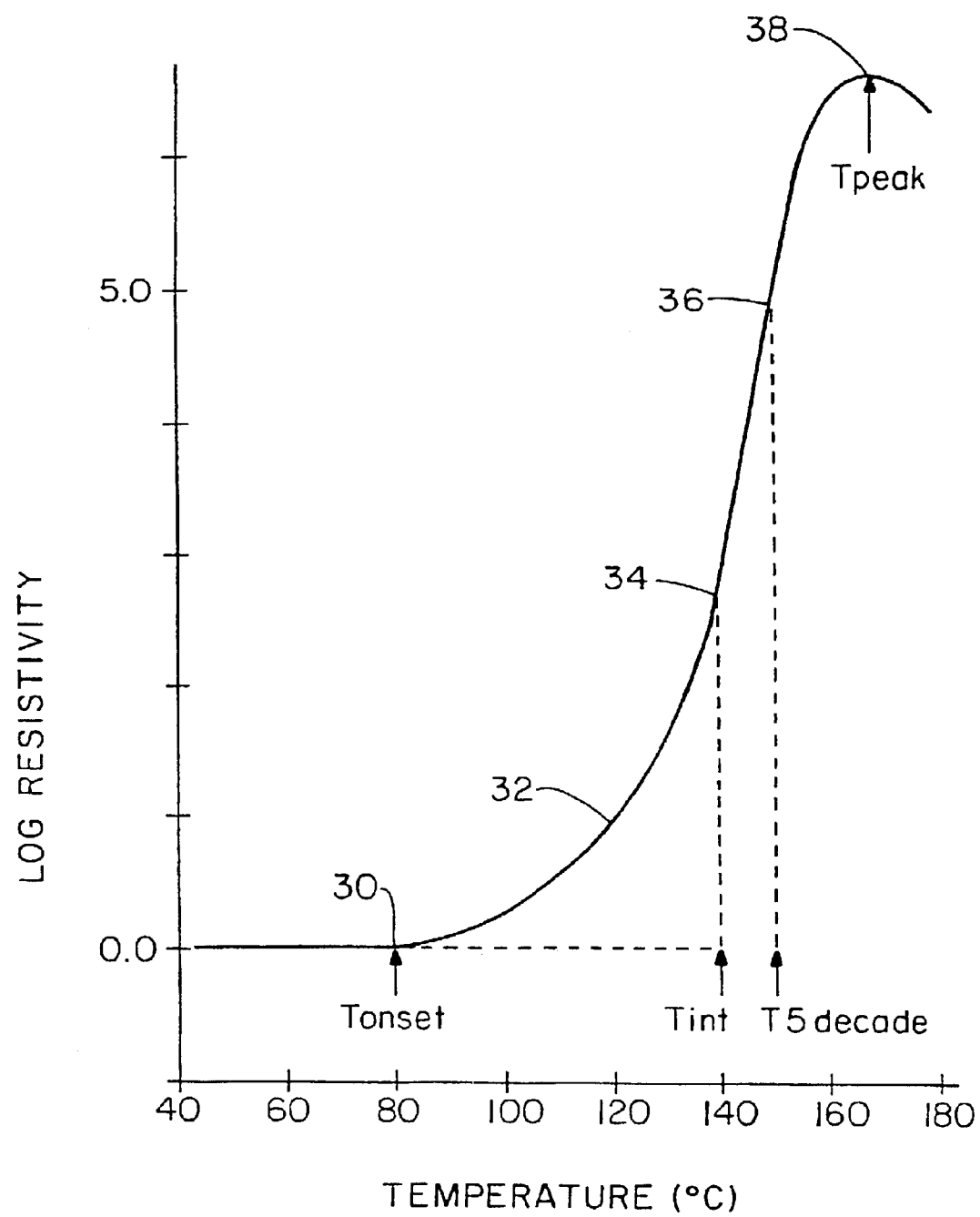
FIG. 2 is a graph depicting the operating curve for the polymeric PTC material in the polymer bypass fuse of FIG. 1.

FIG. 1 shows polymer bypass fuse 10 which is comprised of electrical conductor 18 wherein a portion of conductor 18 is surrounded by internal electrode 16 which is essentially a conductive material such as metal like copper. Electrode 16 is then surrounded by a layer of polymeric positive temperature coefficient (PTC) material 14, which is then itself surrounded by a conductive material, similar to that of internal electrode 16, which makes up contact electrode 12. FIG. 1b shows the circular relationship between conductor 18, internal electrode 16, polymeric PTC material 14 and contact electrode 12. While not crucial, it is best that each of the layers be uniform so that the radius from conductor 18 to the outer edge of contact electrode 12 is constant in all directions. FIG. 1c is a schematic representation of bypass fuse 10 as shown in FIGS. 1a and 1b. Feed through conductor 20 represents conductor 18 with connection points 22 on either end of conductor 20 being coupling points used to interface bypass fuse 10 with external circuitry. PTC device 24 is coupled on one end with conductor 20 with component interface point 26 on the other. PTC device 24 represents polymeric PTC material 14 and component interface point 26 represents contact electrode 12.

In operation, bypass fuse 10 is coupled in series with an external electronic circuit such that a signal path, for instance a power supply connection, is connected to conductor 18 to supply power through bypass fuse 10. Because internal electrode 16 is conductive and coupled to conductor 18, current traveling through conductor 18 will also travel through internal electrode 16. At normal temperatures, PTC material 14 conducts electricity due to its normally low resistance thereby providing a path from conductor 18 to contact electrode 12. External circuitry can then be coupled to contact electrode 12 and be supplied with current from conductor 18. This would be one method of coupling a circuit to a power supply so that if the circuit shorted out current could be maintained to other circuits tied to the same supply. Bypass fuse 10 provides this type of protection in that if circuit coupled to contact electrode 12 begins to draw high levels of current, the internal temperature of bypass fuse 10 will increase thereby increasing the temperature of PTC material 14 making it highly resistive. If the temperature reaches a predetermined trip point PTC material 14 will become substantially non-conductive. The advantage provided by bypass fuse 10 is that current flow through conductor 18 is unaffected by the defective circuit which has now been disconnected from conductor 18 due to the high resistive state of PTC material 14.

FIG. 2 shows a graph depicting the operating curve for PTC material 14. PTC material 14, for all practical purposes, has no resistance in temperatures up to approximately 80° C. Once at 80° C., onset temperature 30 is reached and PTC material 14 begins to change from its normal crystalline state to an amorphous state where its resistance begins to increase. As PTC material 14 continues to increase in temperature it enters polymeric expansion area 32 where it slowly increases in resistance in almost a linear fashion as the temperature increases. At approximately 140° C. current flow interrupt temperature 34 is reached at which PTC point material 14 is primarily resistive thereby preventing most current flow between internal electrode 16 and contact electrode 12. As the temperature continues to increase, PTC material 14 will increase in resistance by five decades at point 36 and then finally reach its peak resistance temperature 38 at approximately 170° C. Once PTC material 14 reaches point 36, substantially no current is flowing through material 14.

FIG. 3 shows hybrid bypass fuse 50 which incorporates a polymeric PTC bypass fuse with additional electronic components. The physical embodiment of bypass fuse 50 in FIG. 3 is shown in cross section and is represented schematically by FIG. 4 or FIG. 5, depending upon the makeup of material 58. FIG. 3 is similar to the embodiment shown in FIG. 1 with the addition of material 58 and insulation 62. As described earlier, conductor 56 passes through bypass fuse 50 and is electrically coupled to internal electrode 54. PTC material 60 then surrounds a portion of internal electrode 54 with PTC material 60 itself surrounded by dielectric material 58. Depending on its makeup, material 58 when used with internal electrode 54 and contact electrode 52, forms either a varsity 76 as shown in FIG. 4 or a capacitor 82 as shown in FIG. 5 is formed in series with PTC device 74. To further protect bypass fuse 50 from damage and its surrounding environment, insulation 62 is added to seal PTC material 60 and material 58 within contact electrode 52. Insulation 62 also maintains electrical isolation between contact electrode 52 and conductor 56.

As described for FIG. 1, PTC material 60, when operated under normal conditions, allows conduction from conductor 56, through internal electrode 54 to material 58, internal electrode 54 and contact electrode 52, as shown in FIG. 3, act as parallel plates separated only by material 58 and PTC material 60. If material 58 is a material as found in capacitors then FIG. 5 schematically represents the embodiment shown in FIG. 3 consisting of PTC device 74 coupled in series with capacitor 82, together coupled from feed through conductor 70 to connection point 78. If material 58 is a metal oxide or MOVE-type material then the configuration shown in FIG. 4 is representative consisting of PTC device 74 coupled in series with varsity 76 together coupled from feed through conductor 70 to connection point 78. In both FIGS. 4 and 5, feed through conductor 70 having feed through connection points 72 on either end represents conductor 56. PTC device 74 represents material 60 which comes in physical contact with internal electrode 54 and material 58. The embodiment shown in FIG. 3 is a simple configuration that allows current to flow through conductor 56 and at the same time allows for coupling of components to conductor 56 through fuses. This prevents conductor 56 from being loaded down under abnormal operating conditions by breaking the electrical connection of additional components while being able to reset automatically once faulty conditions are corrected.

FIG. 6 shows bypass fused line-to-line filter 90 which makes up a line conditioning device which incorporates two polymer bypass fuses 10 with either differential and common mode filter/over current protection device 94 or differential and common mode filter 96, as shown in FIGS. 7 and 8. Both differential and common mode filter/over current protection device 94 and differential and common mode filter 96 are described in relation to FIGS. 14 through 16 and in Applicant's currently pending application Ser. No. 08/841,940 filed on Apr. 8, 1997 which is incorporated herein by reference. If either configuration 94 or 96 shorts or fails causing abnormal current draw, PTC devices 24 will increase in resistance until configurations 94 or 96 are disconnected from feed through conductors 20 so that other circuitry coupled to feed through conductors 20 is unaffected by the faulty components. If at any time the malfunction is corrected, current draw through bypass fuse 10 will decrease thereby decreasing the temperature of PTC device 24. As the temperature returns to normal bypass fuse 10 will become conductive and circuit configurations 94 or 96 will once again be coupled to feed through conductors 20.

Figure 9:
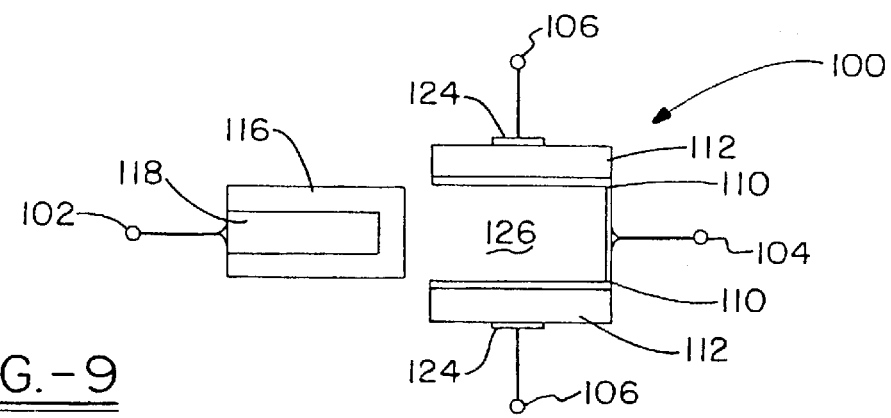
FIG. 9 is an exploded front elevational view in cross section of an in-line and bypass fuse.
Figure 10:
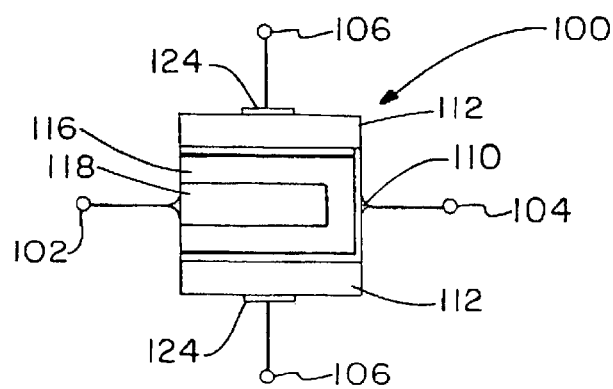
FIG. 10 is a front elevational view in cross section of the in-line and bypass fuse of FIG. 9.
Figure 11:
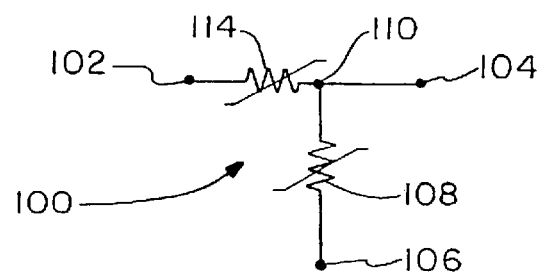
FIG. 11 is a schematic diagram which represents electrically the in-line and bypass fuse shown in FIGS. 9 and 10.

FIGS. 9, 10 and 11 disclose a further embodiment of the present invention which provides both in-line and bypass fuse protection. Beginning with FIG. 11, a schematic representation of in-line and bypass fuse 100, bypass connection 106 is electrically coupled in series with PTC device 108 which is then coupled to feed through termination conductor 110. In-line connection 104 is directly coupled to feed through termination conductor 110 which is coupled to PTC devices 114 and 108. Such a configuration allows, for example, a power supply to be coupled to in-line connection 104 to provide power through in-line connection 102 for external circuitry. Bypass connection 106 allows additional circuitry to be tied off of the same power supply. The configuration shown in FIG. 11 provides for total protection in that current overloads, whether coupled in series or in parallel with a circuit connected to in-line connection 104 are now provided with automatically reset table fuse protection.

In-line and bypass 100, in both FIGS. 9 and 10, is shown in cross section and, as in the embodiment of FIG. 1, is preferred to be circular in shape. Describing the device vertically from top to bottom, in FIG. 10, bypass connection 106 is coupled to outer casing or termination band 124 which is a conductive metallic surface encircling the outer circumference of in-line and bypass fuse 100. Bypass connection 106 is optional as external circuitry could be coupled directly to conductive termination band or casing 124 with the same effect. Within outer termination band 124 is contact electrode 110 having a U-shaped cavity which maintains a barrier between outer casing 124 and inner area 126. PTC material 112 is maintained between and separates outer termination band 124 and contact electrode 110. In-line connection 102 is then coupled to contact electrode 118 and disposed within inner area 126 with PTC material 116 covering contact electrode 118 thereby creating a barrier between contact electrode 118 and contact electrode 110. FIG. 10 shows in-line and bypass fuse 100 in cross section fully assembled. Under normal operating conditions, power coupled to in-line connection 102 will be made available at in-line connection 104 and bypass connections 106 due to the normally conductive state of PTC materials 112. When such material is normally conductive, in-line and bypass fuse 100 is essentially a single electrical node.

Figure 12:
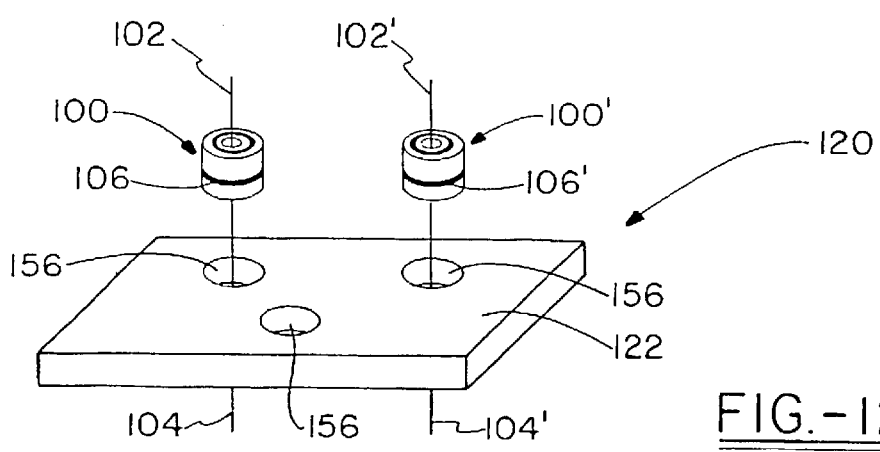
FIG. 12 is an exploded perspective view of a plurality of in-line and bypass fuses as shown in FIGS. 9 through 11 incorporated within a filter to create a hybrid differential and common mode filter with in-line and bypass fuse protection.

FIG. 12 shows component 120 which is an embodiment of the present invention having both in-line and bypass fuse protection, as shown in FIGS. 9–11, combined with a differential and common mode filter. Component 120 is comprised of differential and common mode filter 122 having a plurality of apertures 156 in which in-line and bypass fuses 100 and 100' are within. Each fuse 100 and 100' includes first in-line connections 102 and 102' and second in-line connections 104 and 104' which are conductors allowing feed through coupling of electrical signals through the fuses. Fuse 100 and 100' also include bypass connection 106 and 106'.

Figure 13:
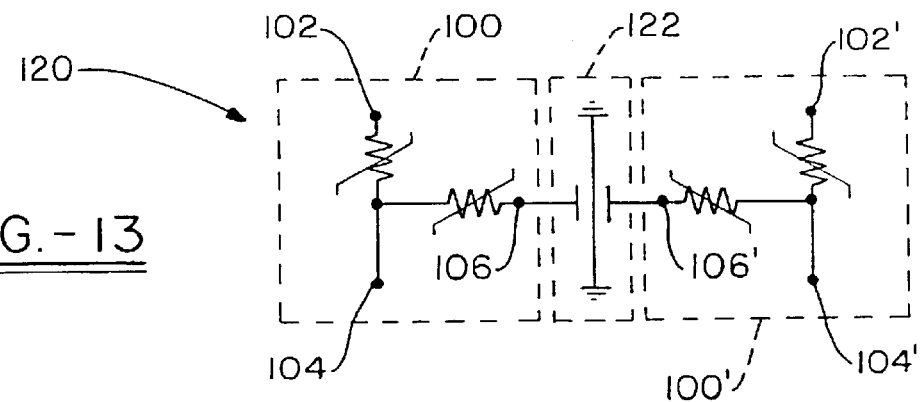
FIG. 13 is a schematic representation of the electrical characteristics of the hybrid component shown in FIG. 12.

FIG. 13 is a schematic representation of component 120, shown in FIG. 12, with differential and common mode filter 122 coupled to in-line and bypass fuses 100 and 100' wherein each fuse provides protection between first and second in-line connections 102 and 104 and protection between second in-line connection 104 and bypass connection 106. The configuration shown in both FIGS. 12 and 13 allows differential and common mode filtering between two conductors while at the same time providing bypass protection if differential and common mode filter 122 fails. Conduction between first and second in-line connections 102 and 104 is not affected by failure of filter 122 and at the same time protection is provided for each conductive path due to in-line fuse protection. The same relationships apply to in-line connections 102' and 104' although not described. The configuration provides all the benefits of differential and common mode filtering while providing its own fail-safe, protection i.e., if the filter fails it takes itself completely out of the circuit allowing for continued operation of the external circuitry coupled to the filter with the only consequence being the elimination of the differential and common mode filtering. This type of protection is necessary in applications in which filtering is desirable but not necessary and failure of the filtering otherwise would disable the application all together. An example of this is in the automotive industry. Automobiles today increasingly rely upon electronics and microcomputer control of everything from engine performance to stereo systems to power windows and locks. Because of the increased amount of electronics within automobiles, the need for differential and common mode filtering has increased exponentially over the years. In the past, if the filter failed the potential for an overall short circuit existed which in some cases would completely disable the vehicle leaving the driver stranded. Because of this obvious drawback, the need for filter protection with the ability to remove itself from its host upon failure is extremely desirable. Not only could a driver or user be left stranded but electrical failure during operation could cause other systems to fail such as power steering or power brakes thereby placing the user in extreme danger. Of course, automobiles are not the only use for the present invention, all types of electronic circuits such as those used in airplanes, trains and heavy equipment all can benefit from the combination of differential and common mode filtering with in-line and bypass fuse protection.

Figure 14:
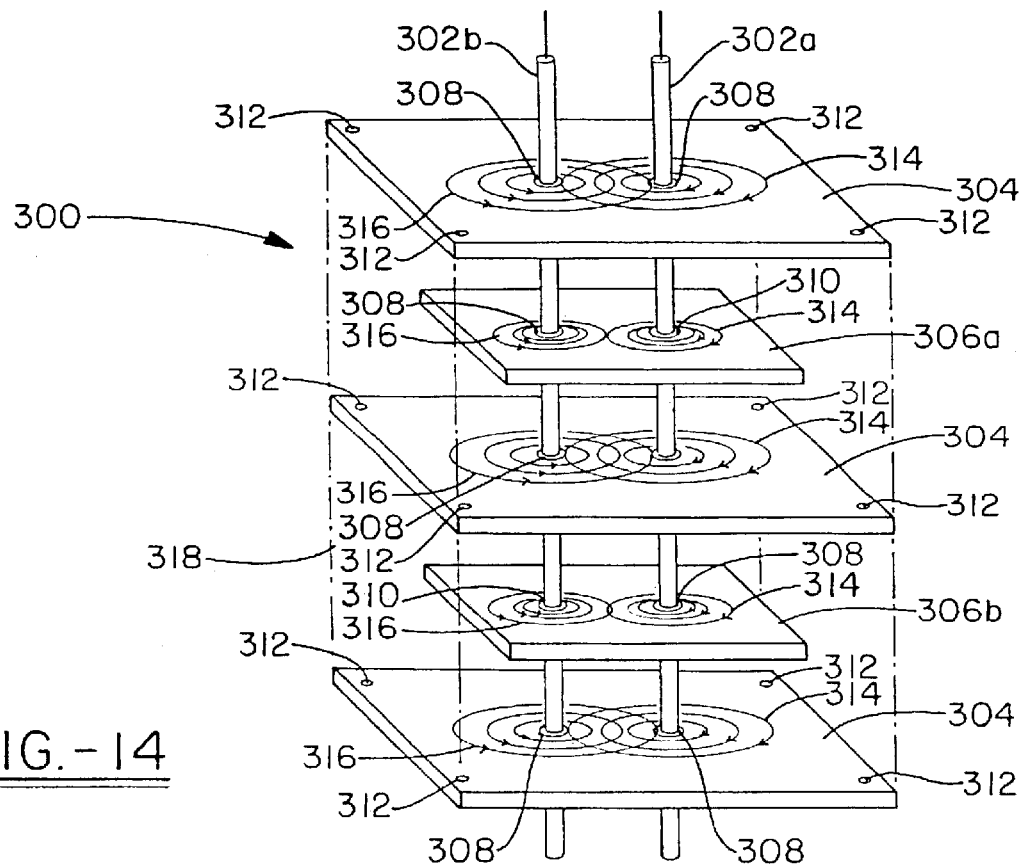
FIG. 14 shows an exploded perspective view of a differential and common mode filter similar to that shown in FIG. 12.

FIG. 14 shows an exploded perspective view of the physical architecture of differential and common mode filter 300. Differential and common mode filter 300 is described fully in Applicant's currently pending application Ser. No. 08/841,940, which has already been incorporated by reference. Nevertheless, the filter will be described herein in some detail. Filter 300 is comprised of a plurality of common ground conductive plates 304 at least two electrode plates 306a and 306b where each electrode plate 306 is sandwiched between two common ground conductive plates 304. At least one pair of electrical conductors 302a and 302b is disposed through insulating apertures 308 or coupling apertures 310 of the plurality of common ground conductive plates 304 and electrode plates 306a and 306b with electrical conductors 302a and 302b also being selectively connected to coupling apertures 310 of electrode plates 306a and 306b. Common ground conductive plates 304 consist entirely of a conductive material such as metal in the preferred embodiment. At least one pair of insulating apertures 308 are disposed through each common ground conductive plate 304 to allow electrical conductors 302 to pass through while maintaining electrical isolation between common ground conductive plates 304 and electrical conductors 302. The plurality of common ground conductive plates 304 may optionally be equipped with fastening apertures 312 arranged in a predetermined and matching position to enable each of the plurality of common ground conductive plates 304 to be coupled securely to one another through standard fastening means such as screws and bolts. Fastening apertures 312 may also be used to secure differential and common mode filter 300 to another surface such as an enclosure or chassis of the electronic device filter 300 is being used in conjunction with.

Electrode plates 306a and 306b are similar to common ground conductive plates 304 in that they are comprised of a conductive material and have electrical conductors 302a and 302b disposed through apertures. Unlike common ground conductive plates 304, electrode plates 306a and 306b are selectively electrically connected to one of the two electrical conductors 302. While electrode plates 306, as shown in FIG. 14, are depicted as smaller than common ground conductive plates 304 this is not required but in this configuration has been done to prevent electrode plates 306 from interfering with the physical coupling means of fastening apertures 312.

Electrical conductors 302 provide a current path which flows in the direction indicated by the arrows positioned at either end of the electrical conductors 302 as shown in FIG. 14. Electrical conductor 302a represents an electrical signal conveyance path and electrical conductor 302b represents the signal return path. While only one pair of electrical conductors 302a and 302b is shown, Applicant contemplates differential and common mode filter 300 being configured to provide filtering for a plurality of pairs of electrical conductors creating a high density multi-conductor differential and common mode filter.

The final element which makes up differential and common mode filter 300 is material 318 which has one or a number of electrical properties and surrounds the center common ground conductive plate 304, both electrode plates 306a and 306b and the portions of electrical conductors 302a and 302b passing between the two outer common ground conductive plates 304 in a manner which completely isolates all of the plates and conductors from one another except for the connection created by the conductors 302a and 302b and coupling aperture 310. The electrical characteristics of differential and common mode filter 300 are determined by the selection of material 318. If a dielectric material is chosen filter 300 will have primarily capacitive characteristics. Material 318 may also be a metal oxide varsity material which will provide capacitive and surge protection characteristics. Other materials such as ferrites and sintered polycrystalline may be used wherein ferrite materials provide an inherent inductance along with surge protection characteristics in addition to the improved common mode noise cancellation that results from the mutual coupling cancellation effect. The sintered polycrystalline material provides conductive, dielectric, and magnetic properties. Sintered polycrystalline is described in detail in U.S. Pat. No. 5,500,629 which is herein incorporated by reference.

Still referring to FIG. 14, the physical relationship of common ground conductive plates 304, electrode plates 306a and 306b, electrical conductors 302a and 302b and material 318 will now be described in more detail. The starting point is center common ground conductive plate 304. Center plate 304 has the pair of electrical conductors 302 disposed through their respective insulating apertures 308 which maintain electrical isolation between common ground conductive plate 304 and both electrical conductors 302a and 302b. On either side, both above and below, of center common ground conductive plate 304 are electrode plates 306a and 306b each having the pair of electrical conductors 302a and 302b disposed there through. Unlike center common ground conductive plate 304, only one electrical conductor, 302a or 302b, is isolated from each electrode plate, 306a or 306b, by an insulating aperture 308. One of the pair of electrical conductors, 302a or 302b, is electrically coupled to the associated electrode plate 306a or 306b respectively through coupling aperture 310. Coupling aperture 310 interfaces with one of the pair of electrical conductors 302 through a standard connection such as a solder weld, a resistive fit or any other method which will provide a solid and secure electrical connection. For differential and common mode filter 300 to function properly, upper electrode plate 306a must be electrically coupled to the opposite electrical conductor 302a than that to which lower electrode plate 306b is electrically coupled, that being electrical conductor 302b. Differential and common mode filter 300 optionally comprises a plurality of outer common ground conductive plates 304. These outer common ground conductive plates 304 provide a significantly larger ground plane which helps with attenuation of radiated electromagnetic emissions and provides a greater surface area in which to dissipate over voltages and surges. This is particularly true when plurality of common ground conductive plates 304 are not electrically coupled to circuit or earth ground but are relied upon to provide an inherent ground. As mentioned earlier, inserted and maintained between common ground conductive plates 304 and both electrode plates 306a and 306b is material 318 which can be one or more of a plurality of materials having different electrical characteristics.

FIG. 15 is a schematic representation demonstrating that filter 300 provides a line-to-line capacitor 320 between and coupled to electrical conductors 302a and 302b and two line-to-ground capacitors 322 each coupled between one of the pair of the electrical conductors 302 and inherent ground 324. Also shown in dashed lines is inductance 326 which is provided if material 318 is comprised of a ferrite material, as described in more detail later.

FIG. 16 shows a quasi-schematic of the physical embodiment of filter 300 and how it correlates with the capacitive components shown in FIG. 15. Line-to-line capacitor 320 is comprised of electrode plates 306a and 306b where electrode plate 306a is coupled to one of the pair of electrical conductors 302a with the other electrode plate 306b being coupled to the opposite electrical conductor 302b and separated by common ground plate 304 thereby providing the parallel plates necessary to form two capacitors in series. Center common ground conductive plate 304 acts as inherent ground 324 and also serves as one of the two parallel plates for each line-to-ground capacitor 322.

The second parallel plate required for each line-to-ground capacitor 322 is supplied by the corresponding electrode plate 306. By carefully referencing FIG. 14 and FIG. 16, the capacitive plate relationships will become apparent. By isolating center common ground conductive plate 304 from each electrode plate 306a or 306b with material 318 having electrical properties, the result is a capacitive network having a common mode bypass capacitor 320 extending between electrical conductors 302a and 302b and line-to-ground decoupling capacitors 322 coupled from each electrical conductor 302a and 302b to inherent ground 324.

Inherent ground 324 will be described in more detail later but for the time being it may be more intuitive to assume that it is equivalent to earth or circuit ground. To couple inherent ground 324, which center and additional common ground conductive plates 304 form, one or more of common ground conductive plates 304 are coupled to circuit or earth ground by common means such as a soldering or mounting screws inserted through fastening apertures 312 which are then coupled to an enclosure or grounded chassis of an electrical device. While differential and common mode filter 300 works equally well with inherent ground 324 coupled to earth or circuit ground, one advantage of physical architecture of is filter 300 that a physical grounding connection is unnecessary.

Referring again to FIG. 14, an additional feature of differential and common mode filter 300 is demonstrated by clockwise and counterclockwise flux fields, 314 and 316 respectively. The direction of the individual flux fields is determined and may be mapped by applying Ampere's Law and using the right hand rule. In doing so an individual places their thumb parallel to and pointed in the direction of current flow through electrical conductors 302a or 302b as indicated by the arrows at either ends of the conductors. Once the thumb is pointed in the same direction as the current flow, the direction in which the remaining fingers on the person's hand curve indicates the direction of rotation for the flux fields. Because electrical conductors 302a and 302b are positioned next to one another and represent a single current loop as found in many I/O and data line configurations, the currents entering and leaving differential and common mode filter 300 are opposed thereby creating opposed flux fields which cancel each other and minimize inductance. Low inductance is advantageous in modern I/O and high speed data lines as the increased switching speeds and fast pulse rise times of modern equipment create unacceptable voltage spikes which can only be managed by low inductance surge devices. When used as a filter the low inductance results in a high self resonant frequency which is desirable in high speed data lines and other high frequency applications.

FIG. 17 is a more detailed view of the apparatus shown in FIGS. 12 and 13. Differential and common mode filter 130, which is similar to the filter described in detail in FIGS. 14, 15, and 16, is comprised of common ground conductive plates 132, 136 and 140 with first and second electrode plates 134 and 138 coupled to the common ground conductive plates so that each electrode plate is maintained between two common ground conductive plates. Although not shown in FIG. 17, FIG. 18 shows that each common ground conductive plate and electrode plate includes a plurality of apertures 156 in which in-line and bypass fuses 100 and 100' are disposed within and then coupled to differential and common mode filter 130. As shown in FIG. 17, in-line and bypass fuse 100 includes insulating surface 146 and bypass connection 144 wherein insulating surface 146 prevents all but a predetermined plate from being electrically coupled to first and second in-line connections 102 and 104. Once fuse 100 is disposed within the selected aperture of differential and common mode filter 130, bypass connection 144 will be electrically coupled to second electrode plate 138. Fuse 100' is identical to fuse 100 but is inserted within a predetermined aperture of filter 130 in the opposite direction as that of fail open fuse 100 so that bypass connection 144' will be electrically coupled to first electrode plate 134.

This arrangement will now be described in more detail with reference to FIG. 18 which shows filter 130 in cross section. Differential and common mode filter 130 is comprised of common ground conductive plates 132, 136 and 140 with first electrode plate 134 maintained between the two common ground conductive plates 132 and 136 and second electrode plate 138 maintained between common ground conductive plates 136 and 140. While the numerous plates are maintained adjacent each other they do not actually come in contact with one another but instead are surrounded by material 152 having predetermined electrical properties as described earlier. The outer edges of each common ground conductive plate are coupled to common ground 154 which electrically connects each of the common ground conductive plates to one another. Common ground 154 allows for a more distributed inherent ground for filter 130. In-line and bypass fuse 100 is disposed within filter 130 through aperture 156. Although not shown, bypass connection 144 of in-line and bypass fuse 100 is electrically coupled to first electrode plate 134 by coupling 150. Coupling 150 is used in various places and may consist of any material that will maintain electric and physical coupling between two conductive surfaces. In the preferred embodiment coupling 150 is a type of solder or weld. Fuse 100' is also disposed within filter 130 through an aperture 156 such that bypass connection 144', not shown, is electrically coupled to second electrode plate 138 via a coupling 150. An alternate approach to interconnecting the common ground plates consists of using conductive rod 158 disposed within filter 130 to provide a means of connecting a true ground to the various common ground conductive plates. As shown in FIG. 18, coupling 150 is used to electrically connect conductive rod 158 to each of the common ground conductive plates 132, 136 and 140. Again not shown, in-line and bypass fuses 100 and 100' could consist entirely of a conductive surface as opposed to having bypass connection 144 and insulating surface 146. In this type of configuration the individual common ground conductive plates and unwanted electrode plate would have insulation within apertures 156 thereby only allowing electrical coupling between the desired fuse and a predetermined electrode or common ground conductive plate. In this alternate embodiment, in-line and bypass fuse 100 and 100' would be identical and could be inserted within differential and common mode filter 130 in the same direction or orientation as opposed to opposite directions from one another. Although the principals, preferred embodiments and preferred operation of the present invention have been described in detail herein, this is not to be construed as being limited to the particular illustrative forms disclosed. It will thus become apparent to those skilled in the art that various modifications of the preferred embodiments herein can be made without departing from the spirit or scope of the invention as defined by the appended claims.

What is claimed is:

1. A device comprising;
   a first electrode defining at least the following elements, (1) upper plate, (2) a center plate, and (3) a lower plate, and wherein said upper plate is above said center plate and said center plate is above said lower plate;
   a second electrode defining at least a second electrode plate, and wherein said second electrode plate is below said upper plate and above said center plate;
   a third electrode defining at least a third electrode plate, and wherein said third electrode plate is below said center plate and above said lower plate;
   wherein said first electrode, said second electrode, and said third electrode, are each conducively isolated from one another;
   a plurality of fuses including a first fuse and a second fuse;
   wherein said first fuse is conducively coupled to said second electrode, and wherein said second fuse is conducively coupled to said third electrode; and
   wherein said second electrode, said third electrode, and said center plate are positioned such that a line passing through said second electrode and said third electrode contacts said center plate.

2. The device of claim 1, further comprising a ceramic dielectric, and wherein said ceramic dielectric is at least maintained between said first, said second and said third electrode.

3. The device of claim 1, further comprising a dielectric, and wherein said dielectric is at least maintained between any said plate of said device.

4. The device of claim 2 practicable for providing at least a line-to-line capacitor and two line-to-ground capacitors to a circuit.

5. The device of claim 3 practicable for providing at least a line-to-line capacitor and two line-to-ground capacitors to a circuit.

6. The device of claim 1, further comprising a material, and wherein said material is at least maintained between any said plate of said device; and
   wherein said material is a material having either predominate ferrite properties, or predominate varsity properties.

7. The device of claim 5, wherein at least said upper plate, said center plate, and said lower plate are of substantially the same size;
   wherein said second electrode plate and said third electrode plate are of substantially the same size; and
   wherein at least said second electrode plate and said third electrode plate are each smaller than either said upper plate, said center plate, or said lower plate.

8. A device comprising;
   a first and a second fuse conducively isolated from each other;
   a first and a second electrode;
   a shielding electrode, and wherein said shielding electrode is arranged between said first and said second electrode;
   wherein said first fuse is conducively coupled to said first electrode;
   wherein said second fuse is conducively coupled to said second electrode;
   wherein said shielding electrode, said first electrode, and said second electrode are each conducively isolated from one another; and
   wherein a line passing through at least said first electrode to said second electrode contacts said shielding electrode.

9. The device of claim 8, further comprising a material practicable for spacing apart electrodes; and
   wherein said material is comprised of any one material or any combination of materials taken from a group of materials consisting of a dielectric material, a ferromagnetic material, and a varsitor material.

10. The device of claim 9, wherein said shielding electrode is larger than at least said first electrode.

11. The device of claim 8, practicable for providing at least a line-to-line capacitor and two line-to-ground capacitors to a circuit.

12. The device of claim 11, wherein either said first fuse or said second fuse comprise a PTC material.

13. A method of making a device comprising:
   providing at least a first and a second fuse that are conducively isolated from each other;
   providing at least a first and a second electrode that are conducively isolated from each other;

providing at least a shield electrode, wherein said shield electrode is arranged between said first and said second electrode maintaining electrical isolation from each said electrode;

wherein said first fuse is conducively coupled to said first electrode;

wherein said second fuse is conducively coupled to said second electrode; and wherein a line passing through said first electrode and said second electrode contacts said shield electrode.

14. The method of making a device of claim 13, wherein said method results in an energy bypass device practicable for differential mode and common mode noise filtering between at least said first electrode and said second electrode when energized.

15. The method of making a device of claim 13, wherein said first electrode and said second electrode are of substantially the same size and shape as one another.

16. The method of making a device of claim 13, wherein said first electrode and said second electrode are arranged in opposite orientation relative to each other.

17. The method of making a device of claim 16, wherein said first electrode and said second electrode are each smaller than said shielding electrode.

18. The method of making a device of claim 13, wherein said first electrode and said second electrode are of substantially the same size and shape as one another;

wherein said first electrode and said second electrode are arranged in opposite orientation device relative to each other; and wherein said first electrode and said second electrode are each smaller than said shielding electrode.

19. A method of transmitting a signal comprising:

providing at least a first and a second fuse that are conducively isolated from each other;

providing at least a first and a second electrode that are conducively isolated from each other;

providing at least a shield electrode, wherein said shield electrode is arranged between said first and said second electrode maintaining electrical isolation from each said electrode;

wherein said first fuse is conducively coupled to said first electrode;

wherein said second fuse is conducively coupled to said second electrode;

wherein an imaginary straight line passing through said first electrode and said second electrode always contacts said shield electrode;

connecting said first electrode and said second electrode in a circuit;

connecting said shield electrode to a conductive area, and wherein said conductive area is not directly connected to a energy source or a load; and transmitting a signal to at least said second electrode.

20. The method of transmitting a signal of claim 19 practicable for providing at least a line-to-line capacitor and two line-to-ground capacitors to said circuit.

* * * * *